United States Patent
Lee

(10) Patent No.: US 7,068,775 B1
(45) Date of Patent: Jun. 27, 2006

(54) SYSTEM AND METHOD FOR MANAGING A HOLD QUEUE BASED ON CUSTOMER INFORMATION RETRIEVED FROM A CUSTOMER DATABASE

(75) Inventor: Gene W. Lee, Plano, TX (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/203,965

(22) Filed: Dec. 2, 1998

(51) Int. Cl.
H04L 12/28 (2006.01)

(52) U.S. Cl. .............. 379/265.02; 379/265.11; 379/266.01; 379/309

(58) Field of Classification Search ........... 377/207, 377/265, 266, 201, 211, 309
See application file for complete search history.

(56) References Cited

U.S. PATENT DOCUMENTS

| | | | |
|---|---|---|---|
| 5,164,981 A * | 11/1992 | Mitchell et al. ........... 379/212 |
| 5,278,898 A | 1/1994 | Cambray et al. .......... 379/266 |
| 5,311,572 A * | 5/1994 | Friedes et al. ............. 379/207 |
| 5,515,421 A | 5/1996 | Sikand et al. ............. 379/67 |
| 5,600,710 A | 2/1997 | Weisser, Jr. et al. ....... 379/67 |
| 5,646,988 A | 7/1997 | Hikawa ................... 379/266 |
| 5,692,033 A * | 11/1997 | Farris ...................... 379/265 |
| 5,754,639 A * | 5/1998 | Flockhart et al. .......... 379/221 |
| 5,787,162 A | 7/1998 | Javitt ....................... 379/229 |
| 5,793,861 A | 8/1998 | Haigh ..................... 379/266 |
| 5,946,388 A * | 8/1999 | Walker et al. ............. 379/266 |
| 6,088,444 A * | 7/2000 | Walker et al. ............. 379/266 |
| 6,173,052 B1 * | 1/2001 | Brady ...................... 379/265 |
| 6,330,326 B1 * | 12/2001 | Whitt .................... 379/265.13 |
| 6,606,668 B1 * | 8/2003 | MeLampy et al. ......... 709/241 |
| 2002/0131399 A1 * | 9/2002 | Philonenko et al. | |
| 2003/0191676 A1 * | 10/2003 | Templeton | |

* cited by examiner

Primary Examiner—William J. Deane, Jr.
(74) Attorney, Agent, or Firm—Bourque & Associates, P.A.

(57) ABSTRACT

A system, including a method for prioritizing on hold calls connected to an automated telephone system is disclosed. The system and method utilizes customer information retrieved from a customer database as call prioritizing information for each connected call. The method begins by connecting a plurality of calls to the automated telephone system. Caller identifying information is obtained from each connected call and each connected call is placed on hold. Then, a customer database is searched and a customer database record is identified corresponding the obtained caller identifying information for each connected call. A call record for each connected call is created and inserted into the hold queue. Each call record includes the caller identifying information and call prioritizing information corresponding to the connected call. The connected calls are then directed to available agents based on the call prioritizing information stored in each call record in the hold queue.

20 Claims, 3 Drawing Sheets

SYSTEM AND METHOD FOR MANAGING A HOLD QUEUE BASED ON CUSTOMER INFORMATION RETRIEVED FROM A CUSTOMER DATABASE

FIELD OF THE INVENTION

This invention relates to automated telephone systems and more particularly to a system and method for managing telephone calls that have been placed on hold and are held in a hold queue.

BACKGROUND OF THE INVENTION

Automated telephone systems are in widespread use among users such as telemarketing, credit collecting and reservation services. Users of such system desire to optimize system performance by attempting to ensure nearly 100% operator productivity while minimizing the number of calls which are placed into a hold queue while waiting for an available operator. This concern arises from the fact that customers who are placed on hold will at some point hang up and be lost.

Several prior art systems and methods have been developed to prioritize the order in which calls placed on hold are answered. However, all have been met with limited success. Early systems and methods include prioritizing the on-hold calls based upon the telephone number dialed. For example, long distance callers who are on hold may be handled before on-hold local callers. Another method involves prioritizing the on-hold calls strictly by age or the length of time the call has been placed on hold. However, this method fails to recognize the non-uniformity in the willingness of customers to remain on hold based upon the length of time the caller has been on hold. For example, a customer who has been on hold for 30 or 40 seconds may not be more apt to hang up then a customer who has been on hold for 10 seconds or less. Another example is that customers are more apt to hang up when a message is played during the hold interval. Additionally, such non-uniformity in hold tolerance will vary and change from user to user and from call campaign to call campaign.

In order to address the above-identified concerns, more sophisticated hold queue management systems were developed. An example of one such sophisticated system is disclosed in U.S. Pat. No. 5,278,898, which issued on Jan. 11, 1994 to the assignee of the present application and which is incorporated herein by reference. The '898 patent discloses a system including a method for managing calls on hold connected to an automated telephone system by allowing the system to prioritize the calls on hold according to selectable, dynamically controllable priority criteria. This system places connected calls on hold and a call record corresponding to each of the calls placed on hold is inserted into a hold queue. Each of the call records includes at least a first portion identifying the connected call and a second, call prioritizing portion, which includes predetermined indicia from which call prioritizing may be accomplished. A hold queue prioritizer prioritizes the call records in the hold queue utilizing the predetermined indicia and established a number of call priority categories.

Like all of the prior art systems, even this sophisticated, prior art hold queue management system suffers from a significant drawback; namely, it relies solely upon information received from the call itself for prioritization purposes. It fails to take into account the fact that modern automated telephone systems may have the capability of accessing a wealth of information regarding customers that may be stored in a customer database. This information may be vital to the proper prioritization of a telephone call that is placed in a hold queue.

Accordingly, there is a need for a system and method of prioritizing telephone calls in a hold queue that accesses a customer database, retrieves information about the customer that is relevant to the prioritization of a telephone call and prioritizes the calls in the hold queue based, at least in part, upon the information it retrieves from the customer database.

SUMMARY OF THE INVENTION

The present invention provides a system, including a method for prioritizing on hold calls connected to an automated telephone system by utilizing customer information retrieved from a customer database. The method begins by connecting a plurality of calls to the automated telephone system. Caller identifying information is obtained from each connected call and each connected call is placed on hold. Then, a customer database is searched and a customer database record is identified corresponding the obtained caller identifying information for each connected call. Selected information, which is relevant to the call prioritizing decision is retrieved from the identified customer database record(s). A call record for each connected call is then created and inserted into a hold queue. Each call record includes the caller identifying information and call prioritizing information corresponding to the connected call. The connected calls are then directed to available agents based on the call prioritizing information stored in each call record in the hold queue.

The system includes a call receiver/director for receiving a plurality of calls connected to an automated telephone system and for directing the plurality of connected calls to a plurality of call center agents coupled to the call receiver/director, responsive to the hold queue prioritizer described hereinafter. The system also includes customer database, which includes a plurality of customer database records, which include caller or customer identifying information and a wealth of additional information regarding the customer, including information relevant to a call prioritizing decision.

A hold queue prioritizer is also included. The hold queue prioritizer obtains the caller identifying information from each connected call and searches the customer database to identify a customer record or records that includes the caller identifying information it obtained from each connected call. The hold queue prioritizer then retrieves information from the identified call record(s), which is relevant to the call prioritizing decision.

A call record is then generated by the hold queue prioritizer, which includes the caller identifying information and the call prioritizing information for each connected call.

Finally at least one hold queue is provided, which is coupled to the hold queue prioritizer. The hold queue includes a plurality of memory locations in which a corresponding plurality of call records may be inserted.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
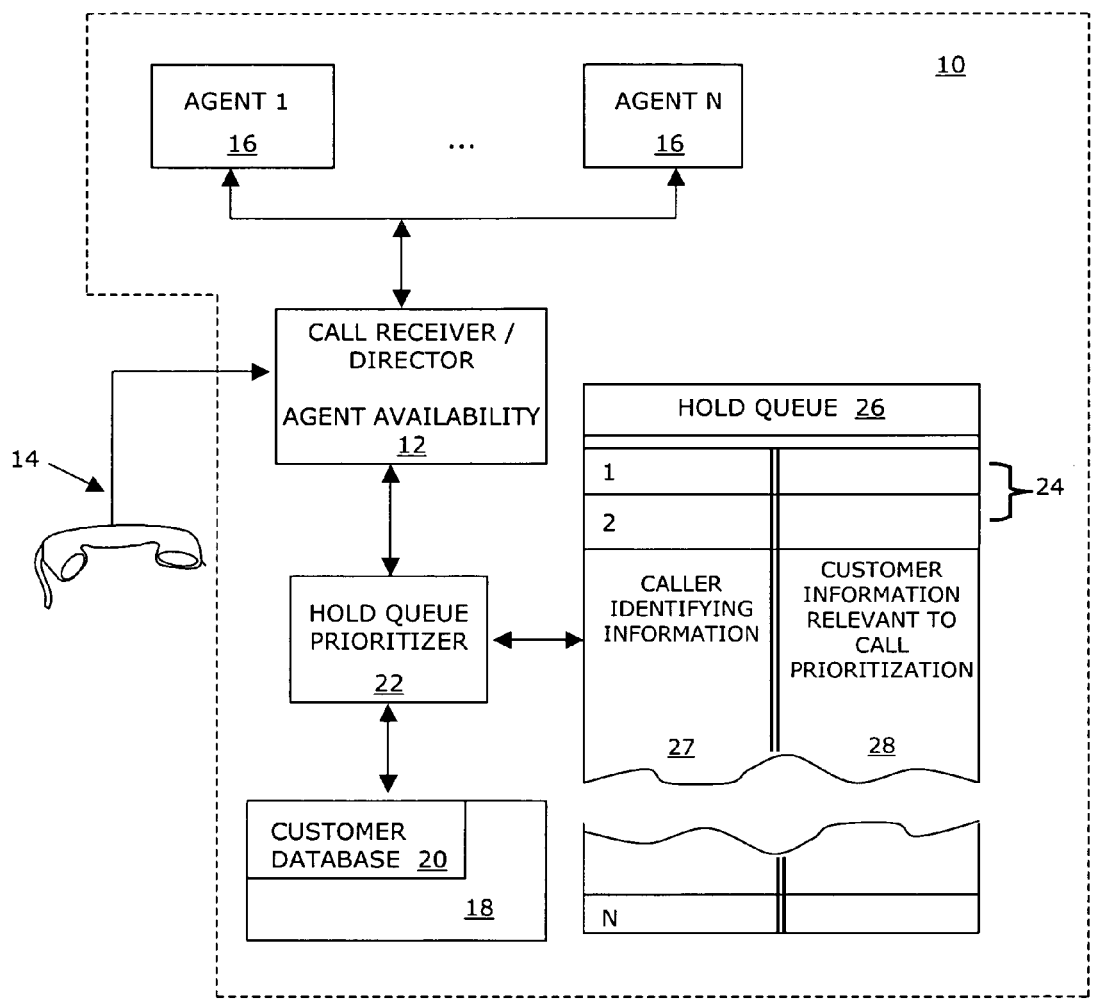
FIG. 1 is a block diagram of a system for prioritizing call records in a hold queue based on customer information maintained in a customer database, according to one embodiment of the present invention.

The system for prioritizing calls on hold in a hold queue according to the present invention is shown within dashed line 10 in FIG. 1. The on hold call prioritizing system 10 includes a call receiver/director 12, which is coupled to one or more telephone lines 14. Call receiver/director 12 is typically a private branch exchange (PBX) telephone switching system that can connect to and switch a number of telephone lines. In the preferred embodiment, the PBX or similar telephone line switch forms a part of an automated telephone calling/answer system. Such systems are well known to those skilled in the art and include systems such as the CAS 2000 and CRS 2000 systems, available from DAVOX Corporation of Westford, Mass.

Call receiver/director 12 is also coupled to one or more call center agent terminals 16, which are capable of being connected to at least one telephone line 14. The call receiver/director 12 also monitors and keeps track of the availability of one or more agents at the call center agent terminals 16. The agent terminals are described in greater detail in U.S. Pat. No. 5,164,981, entitled Voice Response System with Automated Data Transfer, which issued to the assignee of the present invention on Nov. 17, 1992 and which is incorporated herein by reference.

In the preferred embodiment, the agent terminals 16 are also capable of simultaneously connecting to a computer system 18, including a customer database 20, which includes a plurality of customer database files or records. The customer database records include information regarding a plurality of callers or customers, including identifying information as well as information that may be useful in aiding the on hold call prioritizing system of the present invention in making a determination as to which calls on hold should be handled on a priority basis.

For example, a database record may identify a customer as the holder of a "gold" or "platinum" credit card, in which case a call related to that account would be flagged as a priority call. Other information that may be stored in a particular customer database record, such as a record of a recent purchase that may be an indicator that the particular customer is a likely candidate to purchase a specific article or service through a telemarketing firm. In any event, the customer database is an integral part of the present invention for it is the information contained therein that is utilized by the hold queue call prioritizing system in its prioritizing decision.

Upon the connection of one or more calls over telephone lines 14 to the call receiver/director 12, the call receiver/director obtains caller identifying information from the connected call. In one embodiment of the invention, the caller identifying information may include a telephone number from which an incoming call is placed. This can be obtained using well known automatic number identification (ANI) systems as well as other "call tracker" systems and methods. In another embodiment, the call receiver/director may obtain caller identifying information directly from the caller using an integrated voice response (IVR) unit, such as the one described in greater detail in the above-identified U.S. Pat. No. 5,164,981. Of course, other systems and methods of obtaining caller identifying information from a caller are contemplated by the invention.

When the call receiver/director obtains the caller identifying information from a connected call, it places the connected call on hold and forwards the connected caller identifying information to a hold queue prioritizer 22. Upon receipt of the caller identifying information corresponding to each connected call that has been placed on hold, the hold queue prioritizer searches the customer database 20 to identify any customer records that include the same caller identifying information it received from the call receiver/director 12. If one or more customer records are identified, then the call queue prioritizer will retrieve selected information from the identified customer record(s) that is relevant to prioritizing the connected call.

In credit collection scenarios, examples of call prioritizing information include the type of account, the outstanding balance, the age of the outstanding balance and other like information. For telemarketing scenarios, examples of call prioritizing information may include customer buying trends or specific customer purchase transactions that would be related to the goal of the current telemarketing campaign.

Once the hold queue prioritizer retrieves the relevant call prioritizing information or data, it creates a call record 24 for each connected call that is placed on hold. Each call record includes both the caller identifying information that the hold queue prioritizer received from the call receiver/director as well as the call prioritizing information that it retrieved from the customer database record(s). The call records 24 are then inserted into a hold queue 26, until the on hold connected calls are connected to an available agent 16.

The hold queue 26 typically includes a plurality of storage locations such as registers or memory locations in which the plurality of call records are stored. As indicated above, each call record 24 preferably includes a caller identifying portion 27, which identifies the connected call by a number, telephone line or other similar identification indicia. Each call record also includes a call prioritizing portion 28, which is related to the call prioritizing information that the hold queue prioritizer 22 retrieves from the customer database records.

In one embodiment, the call prioritizing portion 28 may include raw data retrieved from the customer database records, an example of which may include the letter "P" to indicate that the pertinent caller on hold is a platinum credit card holder. In other embodiments, the call prioritizing portion 28 may include a call prioritization index, which is derived by the hold queue prioritizer 22 based on one or more pieces of information that it retrieves from a customer database record. Examples of call prioritization indices include alphabetical call priority designations, such as "H", "N" and "L", representing high, normal and low priority calls, respectively.

Alternatively, call prioritization indices may include call numeric call priority scores. Such scores may absolute or relative scores. With the former, multiple connected calls may be assigned identical call priority scores, in which case a subsequent decision process must be employed in order to determine which of the calls having the same call priority score should be connected to an available agent first. Examples of supplemental decision strategies included first-in, first-out (FIFO) or last-in, first-out (LIFO) strategies for identically scored connected calls. Of course more sophisticated supplemental decision strategies that take into account the precise nature of a specific connected call and non-uniformities associated therewith, such as those described in U.S. Pat. No. 5,278,898, are also contemplated by the present invention.

With relative numeric call priority scores, a connected call can be directed to available agent when it has the highest (or lowest depending on the strategy employed) numeric call priority score of all of the call records stored in the hold queue. Of course such a relative numeric call priority score embodiment will include the ability to dynamically adjust the relative call priority scores assigned to the call records included in the hold queue as additional call records are inserted into the queue.

Figure 2:
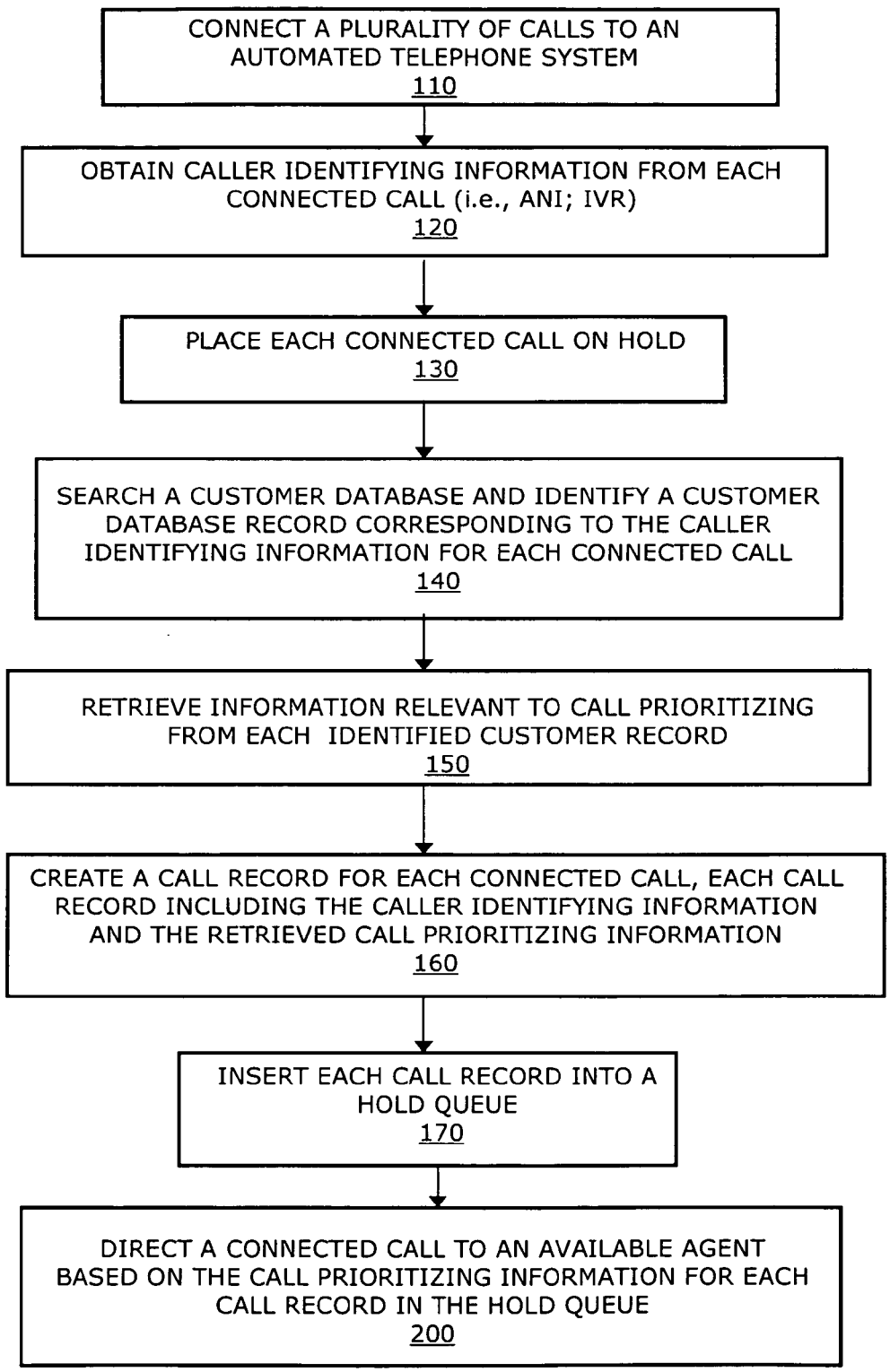
FIG. 2 is a flow chart of a method for prioritizing call records in a hold queue according the one embodiment of the present invention.
Figure 3:
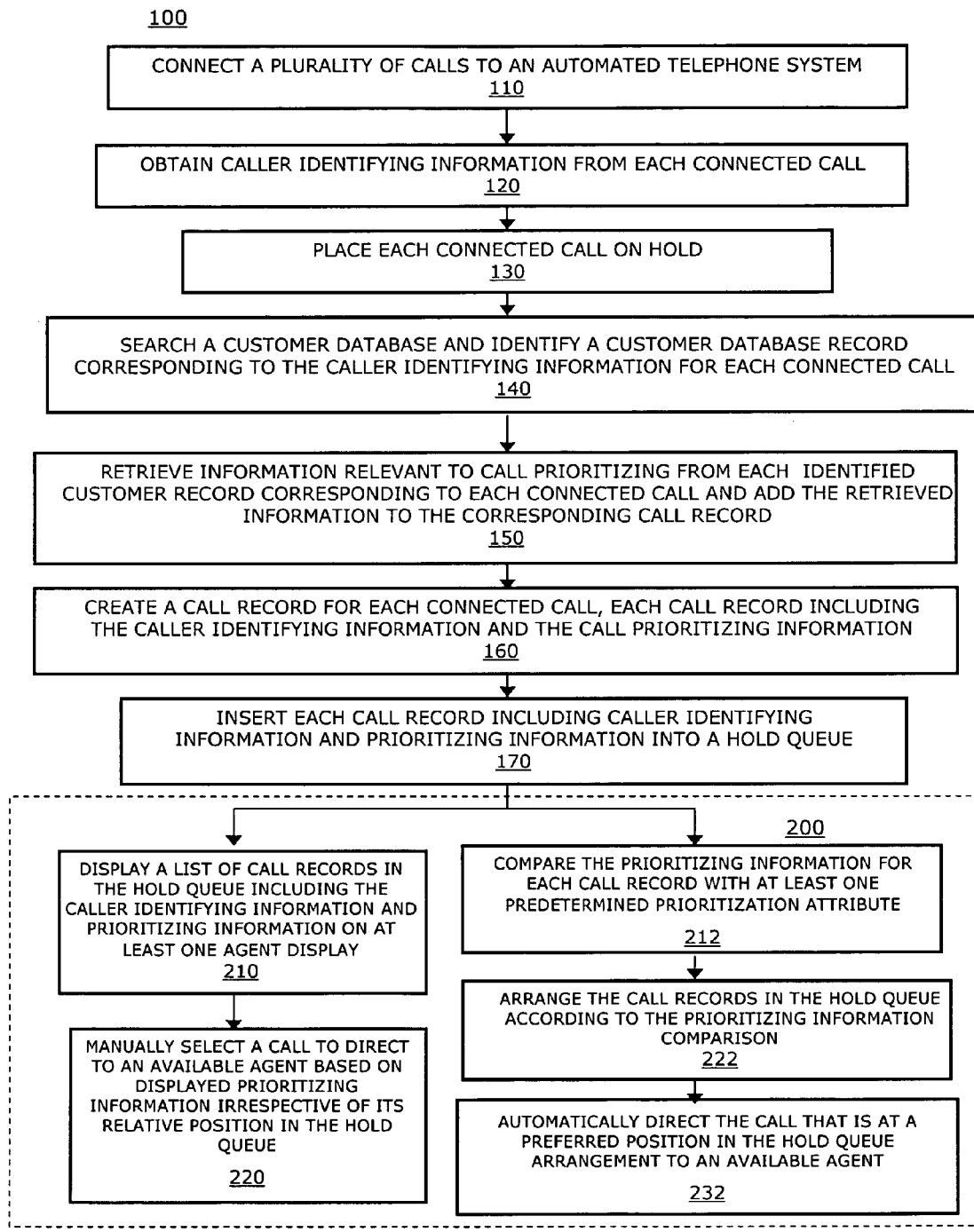
FIG. 3 is a more detailed flow chart of a method for prioritizing call records in a hold queue showing alternative methods of selecting a call to connect to an available agent.

The present invention also includes a method of prioritizing connected calls in a hold queue, which is illustrated in the flow charts of FIGS. 2 and 3. The method 100 begins by connecting a plurality of calls to an automated telephone system, step 110. As each call is connected, the automated telephone system, and in particular the system's call receiver/director, obtains caller identifying information from each connected call, step 120. This step contemplates a wide variety of "call tracker" means for obtaining various types of caller identifying information, such as the ANI and IVR systems mentioned above. The connected call is then placed on hold, step 130.

Once a connected call is identified and the call is placed on hold, the automated telephone system, and in particular, the hold queue prioritizer, searches a plurality of customer database records maintained in a customer database to identify customer database records that correspond to the caller identifying information received from a connected call, step 140. The customer database is provided by the customer and is usually the corporate customer information typically residing on a main frame computer. One or more types of information obtained by the "call tracker" system can be used to search the customer database to find corresponding records.

In step 150, the hold queue prioritizer retrieves information stored in the identified customer database records that may be relevant to a call prioritization decision. As indicated above, a wide variety of information may be relevant to a specific connected call depending upon the precise nature of the call. Therefore, the system allows a system supervisor to program the system to look for different types of customer information in the customer database records.

Once a connected call is identified and call prioritizing information is retrieved from the corresponding customer database records, the call queue prioritizer creates a call record for each connected call, step 160. Each call record includes both the caller identifying information and the call prioritizing information or a derivative thereof, as such as the alphabetic or numerical call priority indices or scores explained earlier.

Each call record is then inserted into a call hold queue, step 170. The automated telephone system then directs the connected calls to a plurality of available agents based on the call prioritizing information included in each call record stored in the hold queue, step 200.

FIG. 3 shows, in more detail, two alternative embodiments contemplated by the invention for directing connected calls to available agents, step 200 of FIG. 2. (Steps 110–160 in FIG. 3 are identical to the identically numbered steps explained above with respect to FIG. 2.)

In a first embodiment of the invention, when a call center agent completes a previous call, that call center agent becomes an available agent. Once an agent becomes an available agent, the automated telephone system will display a list of the call records in the call hold queue, including the connected call identifying information and the corresponding prioritizing information, on the agent display, step 210. The available agent thereafter selects a call to direct to the available agent based on the displayed call prioritizing information, step 220. In this embodiment, the available agent may manually select a call to direct to that agent irrespective of its relative position in the hold queue. In addition, since certain agents may have expertise in handling certain types of calls, different agents may select calls based on both the connected call identifying information as well as the call prioritizing information. For example, a Spanish speaking agent may select a call to handle that has a lower priority than an incoming call from an English speaking customer. Thus, this embodiment would allow a great deal of real-time agent decision-making in the call handling process.

In a second embodiment, the automated telephone system compares the prioritizing information retrieved for each call record with at least one predetermined prioritization attribute, step 212. Then, the system arranges the call records in the hold queue in a prioritized order according to the prioritizing information comparison, step 222. Finally, in this embodiment, the automated telephone system automatically directs the call that is at the top of the call record arrangement to an available agent, step 232. Since this second embodiment envisions an automated decision process, the decision criterion must be capable of being updated from time to time by a system supervisor. In addition, this automated decision making embodiment also allows the call records in the hold queue to be re-arranged or re-ordered as additional call records are inserted into the queue.

Accordingly, the disclosed system and method improves upon the prior art by allowing calls on hold to be prioritized based on customer information that is retrieved from customer database records stored in a customer database, which information may be more relevant to the prioritization decision than information that is obtained directly from a connected call, such as, for example from ANI or IVR systems.

Modifications and substitutions by one of ordinary skill in the art are considered to be within the scope of the present invention which is not to be limited except by the claims which follow.

What is claimed is:

1. A method of prioritizing calls connected to an automated telephone system comprising the steps of:

connecting a plurality of calls to said automated telephone system;

obtaining caller identifying information from each of said connected calls;

placing each of said connected calls on hold;

searching a customer database and identifying a customer database record corresponding to the caller identifying information for each connected call, said identified customer database records including information pertinent about a previous interaction with said customer;

retrieving information from said identified customer database records that is relevant to call prioritization;

creating a call record for each connected call, each call record including said caller identifying information and said retrieved call prioritizing information;

inserting each created call record into a hold queue based on at least said retrieved call prioritizing information, prioritizing said plurality of calls in said hold queue; and directing a connected call from said plurality of prioritized calls in said hold queue to an available agent.

2. The method as claimed in claim 1, wherein each said connected call comprises an incoming telephone call placed by an interested caller to said automated telephone system.

3. The method as claimed in claim 1, wherein said step of selecting a connected call to direct to an available agent comprises;

comparing the retrieved call prioritizing information stored in each call record with at least one predetermined prioritization attribute;

arranging the call records in the hold queue according to the prioritizing information comparison; and automatically directing a connected call that enjoys a highest priority position in said hold queue arrangement to an available agent.

4. The method as claimed in claim 1, wherein said step of obtaining caller identifying information comprises using an automatic number identification (ANI) system to obtain a telephone number from which the connected call is placed.

5. The method as claimed in claim 1, wherein said step of obtaining caller identifying information comprises using an integrated voice response (IVR) system to obtain said caller identifying information directly from a connected caller.

6. The method as claimed in claim 1, wherein said step of directing an available agent comprises displaying a list of call records stored in said hold queue, including said caller identifying information and said call prioritizing information for each said connected call on at least one available agent display and manually selecting a connected call to direct to said available agent.

7. A hold queue prioritizing system comprising:
an automated telephone system;
a call receiver/director for connecting a plurality of calls to said automated telephone system;
a customer database including a plurality of database records, each database record including caller identifying information and information relevant to call prioritization based on a previous interaction with said customer;
a means for obtaining identifying information from each of said plurality of calls connected to said automated telephone system;
at least one hold queue coupled to said call receiver/director, said at least one hold queue for holding call records related to said plurality of connected calls;
a plurality of call center agent terminals coupled to said automated telephone system for handling said connected calls; and
a hold queue prioritizer responsive to said caller identifying information from each of said plurality of calls connected to said automated telephone system, for retrieving at least a portion of said call prioritizing information stored in each said database record corresponding to each connected call, prioritizing said plurality of calls in said hold queue based on at least said retrieved call prioritizing information, and for selecting a connected call to direct from said plurality of prioritized calls in said hold queue.

8. The hold queue prioritizing system as claimed in claim 7, wherein said displayed call prioritizing information comprises raw customer information retrieved from each said customer database record.

9. The hold queue prioritizing system as claimed in claim 7, wherein said displayed prioritizing information comprises a call priority score derived by said hold queue prioritizer responsive to said call prioritizing information retrieved from each said customer database record.

10. The hold queue prioritizing system as claimed in claim 9, wherein said displayed call priority score is an absolute call priority score.

11. The hold queue prioritizing system as claimed in claim 9, wherein said displayed call priority score is a relative call priority score.

12. The hold queue prioritizing system as claimed in claim 7, wherein said means for obtaining caller identifying information comprises an automatic number identification (ANI) system.

13. The hold queue prioritizing system as claimed in claim 7, wherein said means for obtaining caller identifying information comprises an integrated voice response (IVR) system.

14. The hold queue prioritizing system as claimed in claim 7, wherein said hold queue prioritizer comprises a hold queue call record display, displayed on at least on of said plurality of agent terminals, said call record display including caller identifying information and call prioritizing information for each call record in said hold queue and a means for manually directing a call to an available agent based on said displayed connected call information.

15. A system for prioritizing calls on hold and connected to an automated telephone system comprising:
a call receiver/director for receiving a plurality of calls connected to said automated telephone system and for directing said plurality of connected calls to a plurality of agent terminals coupled to said call receiver/director;
a customer database, including customer database records including caller identifying information and call prioritizing information based on a previous interaction with said customer;
at least one hold queue; and
a hold queue prioritizer, coupled to said call receiver/director, said hold queue prioritizer including:
a means for obtaining caller identifying information from each of said plurality of connected calls;
a means responsive to said obtained caller identifying information, for searching said customer database to identifying customer database records corresponding to said obtained caller identifying information for each of said plurality of connected calls, and retrieving said call prioritizing information from each of said identified customer database records;
a means for creating a call record for each of said plurality of connected calls, each call record including said caller identifying information and said call prioritizing information;
a means for prioritizing said plurality of calls in said hold queue based on at least said retrieved call prioritizing information, and
a means for selecting a connected call from said prioritized hold queue to direct to an available agent based on said call prioritizing information.

16. The system for prioritizing calls on hold and connected to an automated telephone system as claimed in claim 15, wherein said means for selecting a call to direct to an available agent comprises a means for automatically directing a connected call to an available agent based on the call prioritizing information stored in said plurality of call records in said hold queue.

17. The system for prioritizing calls on hold and connected to an automated telephone system as claimed in claim 15, wherein said call prioritizing information corresponding to each said connected call comprises raw information retrieved from each said customer database record.

18. The system for prioritizing calls on hold and connected to an automated telephone system as claimed in claim 15, wherein said call prioritizing information corresponding to each said connected call comprises a call priority score derived by said hold queue prioritizer responsive to said retrieved call prioritizing information for each said connected call.

19. The system for prioritizing calls on hold and connected to an automated telephone system as claimed in claim 15, wherein said means for selecting a call to direct to an available agent comprises an on hold call record display for displaying said plurality of call records stored in said hold queue, said displayed call records including caller identifying information and call prioritizing information and a means for allowing an available agent to manually select a connected call to direct to said available agent based on said displayed call prioritizing information.

20. A method of prioritizing calls connected to an automated telephone system comprising the steps of:

connecting a call of a customer to said automated telephone system;

obtaining caller identifying information from said connected call;

placing said connected call on hold;

searching a customer database and identifying a customer database record corresponding to the caller identifying information for said connected call, said identified customer database record including information pertinent about a previous interaction with said customer;

retrieving information from said identified customer database record that is relevant to call prioritization of the said connected call associated with said customer;

creating a call record for said connected call, said call record including said caller identifying information and said retrieved call prioritizing information of said connected call associated with said identified customer;

inserting said created call record into a hold queue based on at least said retrieved call prioritizing information of said connected call associated with said identified customer;

prioritizing said plurality of calls in said hold queue; and directing said connected call from said plurality of prioritized calls in said hold queue to an available agent.

* * * * *